United States Patent [19]
Halliday et al.

[11] Patent Number: 6,080,704
[45] Date of Patent: *Jun. 27, 2000

[54] GLYCOLS AS GAS HYDRATE INHIBITORS IN DRILLING, DRILL-IN, AND COMPLETION FLUIDS

[76] Inventors: William S. Halliday, 12923 Lemur, Cypress, Tex. 77429; Dennis K. Clapper, 10555 Turtlewood, No. 2708, Houston, Tex. 77072; Mark R. Smalling, 23602 Summerpine, Spring, Tex. 77373

[*] Notice: This patent issued on a continued prosecution application filed under 37 CFR 1.53(d), and is subject to the twenty year patent term provisions of 35 U.S.C. 154(a)(2).

[21] Appl. No.: 08/814,247

[22] Filed: Mar. 11, 1997

[51] Int. Cl.$^7$ .............................. C09K 7/02; C09K 3/00; E21B 43/16

[52] U.S. Cl. .................. 507/136; 507/139; 507/110; 507/131; 507/209; 507/244; 507/261; 507/266; 585/15; 166/305.1; 166/371

[58] Field of Search ...................... 507/261, 136, 507/266, 139, 110, 131, 209, 244; 585/15; 166/305.1, 371

[56] References Cited

U.S. PATENT DOCUMENTS

| | | | |
|---|---|---|---|
| 3,348,614 | 10/1967 | Sinclair et al. | 507/136 |
| 4,256,282 | 3/1981 | Goldschild et al. | 251/58 |
| 4,456,067 | 6/1984 | Pinner, Jr. | 166/279 |
| 4,758,357 | 7/1988 | Hoff . | |
| 4,780,220 | 10/1988 | Peterson . | |
| 4,799,962 | 1/1989 | Ahmed . | |
| 4,830,765 | 5/1989 | Perricone et al. . | |
| 4,856,593 | 8/1989 | Matthews et al. | 507/136 |
| 4,915,176 | 4/1990 | Sugier et al. | 507/261 |
| 4,941,981 | 7/1990 | Perricone et al. . | |
| 4,958,685 | 9/1990 | Hihara et al. . | |
| 4,963,273 | 10/1990 | Perricone et al. . | |
| 5,007,489 | 4/1991 | Enright et al. . | |
| 5,008,026 | 4/1991 | Gardner et al. . | |
| 5,057,234 | 10/1991 | Bland et al. . | |
| 5,072,794 | 12/1991 | Hale et al. . | |
| 5,076,364 | 12/1991 | Hale et al. | 507/136 |
| 5,092,405 | 3/1992 | Prukop . | |
| 5,099,930 | 3/1992 | Enright et al. . | |
| 5,114,598 | 5/1992 | Rayborn et al. . | |
| 5,120,708 | 6/1992 | Melear et al. . | |
| 5,141,920 | 8/1992 | Bland et al. . | |
| 5,198,415 | 3/1993 | Steiger . | |
| 5,198,416 | 3/1993 | Hale et al. | 507/136 |
| 5,248,664 | 9/1993 | Hale et al. | 507/136 |
| 5,248,665 | 9/1993 | Hale et al. | 507/136 |
| 5,607,901 | 3/1997 | Toups, Jr. et al. | 507/136 |
| 5,635,458 | 6/1997 | Lee et al. | 507/136 |
| 5,741,758 | 4/1998 | Pakulski | 507/246 |

FOREIGN PATENT DOCUMENTS

| | | |
|---|---|---|
| 2058856 | 1/1991 | Canada . |
| 0 369 692 B1 | 5/1993 | European Pat. Off. . |
| 2 245 292 | 1/1992 | United Kingdom . |
| 2 251 447 | 7/1992 | United Kingdom . |

OTHER PUBLICATIONS

D.T. Lai—"Investigations of Natural Gas Hydrates in Various Drilling Fluids", SPE/IADC 18637, (1989).

*Primary Examiner*—Philip Tucker
*Attorney, Agent, or Firm*—Paula D. Morris

[57] ABSTRACT

The present invention provides a method for suppressing the formation of hydrates during drilling operations under conditions that are conducive to hydrate formation comprising using a water based fluid selected from the group consisting of a drilling, a drill-in, and a completion fluid, wherein said water based fluid comprises as an integral component a hydrate suppressing amount of a water-soluble organic compound having a molecular weight below about 800 and said fluid has effective rheology and fluid loss control properties.

23 Claims, 1 Drawing Sheet

GLYCOLS AS GAS HYDRATE INHIBITORS IN DRILLING, DRILL-IN, AND COMPLETION FLUIDS

FIELD OF THE INVENTION

The present invention relates to methods and compositions for suppressing gas hydrate formation in drilling, drill-in, and completion fluids.

BACKGROUND OF THE INVENTION

The petroleum industry continues to expand deepwater exploration and drilling efforts in many areas of the world. As the drilling water depth increases, the potential for natural gas hydrate formation during drilling operations also increases.

Gas hydrates are solid, ice-like crystals that form under elevated pressures and at moderately low temperatures. Gas hydrates consist of water molecules which form five (pentagon) and six (hexagon) membered polygonal structures which combine to form a closed structure (often called a "cage"). These "cages" totally enclose or trap a gas molecule. At high pressures, multiple "cages" tend to combine to form larger cages enclosing gas molecules. The resulting large crystalline assemblies are thermodynamically favored at elevated pressures. Under sufficient pressure, gas hydrates will form at temperatures well above the freezing point of water.

Primary promoters of gas hydrates are gas with "free" water present at or below its water dew point, low temperatures, and high pressures. Secondary promoters are high velocities, pressure pulsations, any type of agitation, and the introduction of a small crystal of a hydrate. During deepwater drilling operations, all of the primary gas hydrate promoters are present. The drilling fluid supplies the "free" water; low temperatures are encountered on the sea floor [32–45° F. (0–7.2° C.)]; and, the hydrostatic head of the fluid produces high pressures. The formation of gas hydrates may become a problem in a pressure and temperature range between about 500 psia at 35° F. (1.67° C.) or lower to about 8000 psia at 80° F. (26.67° C.) or lower, particularly between about 1000 psia at 35° F. (1.67° C.) or lower to about 6000 psia at 80° F. (26.67° C.) or lower.

The formation of gas hydrates in deepwater drilling operations creates safety concerns and can prevent proper operation of the blowout preventer during well-control operations, causing costly delays in controlling the wells. The use of a 20% sodium chloride/PHPA drilling mud system suppresses gas hydrate formation by 24–28° F. (13.3–15.6° C.) below that of freshwater. Often, however, it is necessary to suppress the temperature of hydrate formation even further—for example, during disconnects. "Spotting" of certain materials reportedly is effective to temporarily remove hydrates from various equipment and/or lines; however, spotting often is not performed until after gas hydrates have formed and caused the very delays sought to be avoided. Drilling fluids are needed which inherently provide the necessary hydrate suppression without the need for spotting and which still have desirable rheology and fluid loss control properties for deepwater environments.

SUMMARY OF THE INVENTION

The present invention provides a method for suppressing the formation of hydrates during drilling operations under conditions that are conducive to hydrate formation comprising using a water based fluid selected from the group consisting of a drilling, a drill-in, and a completion fluid, wherein said water based fluid comprises as an integral component a hydrate suppressing amount of a water-soluble organic compound having a molecular weight below about 800 and said fluid has effective rheology and fluid loss control properties.

DETAILED DESCRIPTION OF THE INVENTION

Figure 1:
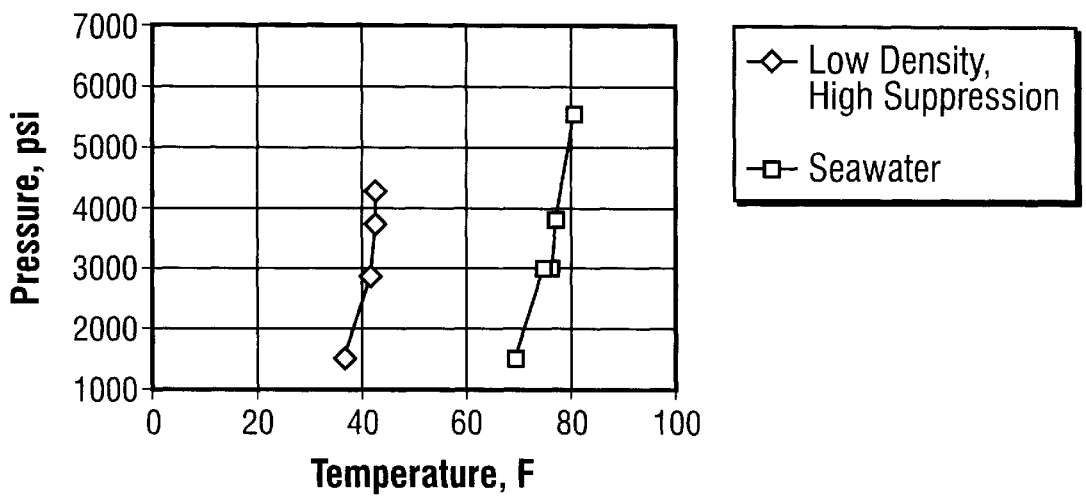
FIG. 1 is a chart comparing hydrate phase equilibrium in a high hydrate suppression fluid containing ethylene glycol with seawater.
Figure 2:
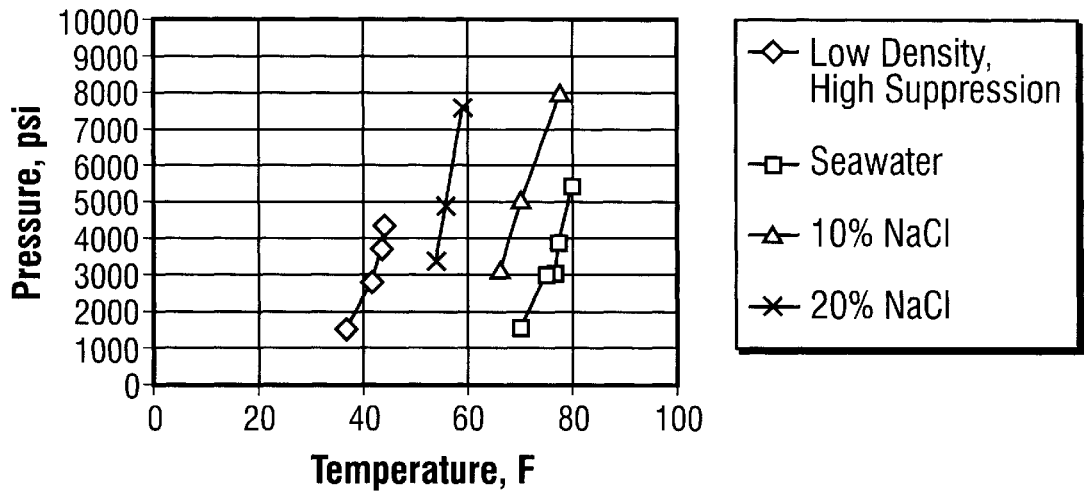
FIG. 2 is a chart comparing hydrate phase equilibrium in a high hydrate suppression fluid containing ethylene glycol with seawater, 10% NaCl, and 20% NaCl.
Figure 3:
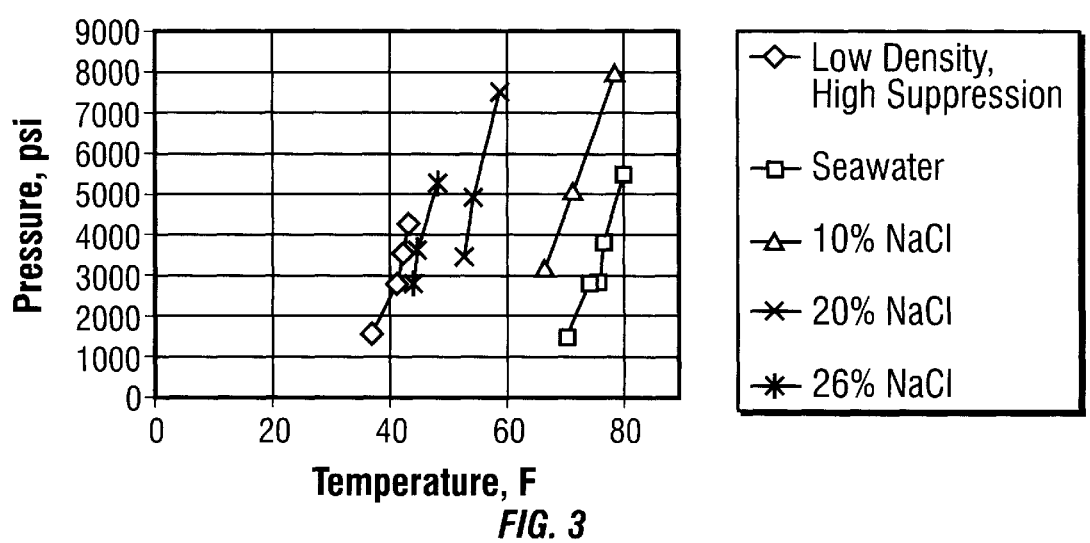
FIG. 3 is a chart comparing hydrate phase equilibrium in a low density, high hydrate suppression fluid containing ethylene glycol with seawater, 10% NaCl, and 20% NaCl, and 26% NaCl.

Gas hydrate suppression is needed for several types of fluids used during drilling operations. Drilling operations typically involve mounting a drill bit on the lower end of a drill pipe or "drill stem" and rotating the drill bit against the bottom of a hole to penetrate a formation, creating a borehole. A drilling mud may be circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole.

A drilling fluid with a relatively high viscosity at high shear rates can place undesirable mechanical constraints on the drilling equipment and may even damage the reservoir. Higher viscosity fluids also exert higher pressures outward on the borehole, which may cause mechanical damage to the formation and reduce the ability of the well to produce oil or gas. Higher viscosity fluids also may fracture the formation, requiring a drilling shut down in order to seal the fracture. In deepwater environments, drilling muds must clean large, often deviated well bores, stabilize tectonically weak formations, inhibit mud making shales, and gain environmental acceptance.

A different fluid, known as a "drill-in" fluid, is pumped through the drill pipe while drilling through the "payzone," or the producing zone. A "completion fluid" is pumped down a well after drilling operations are complete, during the "completion phase," to remove drilling mud from the well and to support the well while the equipment required to produce fluids to the surface is installed in the well. Each of these fluids needs a component that will suppress hydrate formation without adversely affecting the rheological and fluid loss control properties of the fluid.

A desirable characteristic of any drilling fluid is high density combined with an ability to flow easily at high velocities. In rheological terms, the drilling fluid should have a density of between about 0.9–2.5 g/cm$^3$, and a relatively low plastic viscosity, preferably less than about 50, more preferably less than about 40, and most preferably less than about 30. Another desirable Theological property is yield point, which should be at least about 5, preferably from about 5 to 30 lb/100 ft$^2$.

The present invention provides drilling fluids which incorporate as integral components hydrate inhibitors that are non-toxic, economical, and effective to inhibit hydrate formation in the fluid during drilling, drill-in, and completion operations without adversely affecting the Theological and/or fluid loss control properties of the fluid. The hydrate suppressors of the present invention are "low molecular weight water soluble organic compounds." "Low molecular weight" is defined to mean a molecular weight below about 800. Without limiting the present invention to any particular theory or mechanism of action, the low molecular weight water soluble organic molecules are believed to associate with the water molecules in the fluid and to interfere with either the availability of the water molecules or the ability of the water molecules to form polygonal water "cages." The result is that the temperature at which hydrates form is suppressed at least about 10° F. (5.56° C.), preferably by at least about 30° F. (16.7° C.), most preferably by at least about 35° F. (19.4° C.).

Suitable hydrate suppressors for use in the invention include, but are not necessarily limited to glycols, polyglycols, polyalkyleneoxides, alkyleneoxide copolymers, alkylene glycol ethers, polyalkyleneoxide glycol ethers, carbohydrates, amino acids, amino sulfonates, alcohols comprising between about 1–3 carbon atoms, salts of any of the foregoing compounds, and combinations of the foregoing compounds.

Examples of suitable glycols and polyglycols include, but are not necessarily limited to ethylene glycols, diethylene glycols, triethylene glycols, tetraethylene glycols, propylene glycols, dipropylene glycols, tripropylene glycols, and tetrapropylene glycols. Examples of suitable polyalkyleneoxides and copolymers thereof include, but are not necessarily limited to polyethylene oxides, polypropylene oxides, and copolymers of polyethylene oxides and polypropylene oxides. Suitable polyalkyleneoxide glycol ethers include, but are not necessarily limited to polyethylene glycol ethers, polypropylene glycol ethers, polyethylene oxide glycol ethers, polypropylene oxide glycol ethers, and polyethylene oxide/polypropylene oxide glycol ethers. Suitable carbohydrates include, but are not necessarily limited to saccharides and their derivatives. Suitable saccharides include, but are not necessarily limited to monosaccharides, such as fructose and glucose, disaccharides, and any polysaccharides having a molecular weight less than about 800. Suitable saccharide derivatives include, but are not necessarily limited to methylglucosides, methylglucamines, and the like. Suitable alcohols include, but are not necessarily limited to methanol, ethanol, propanol, and isopropanol.

A preferred hydrate suppressor is ethylene glycol, which not only suppresses hydrate formation, but also improves the overall performance of the water based drilling fluid by reducing the density of the fluid when compared to state of the art fluids which exhibit comparable hydrate suppression. Surprisingly, ethylene glycol meets the current EPA requirements for discharge into U.S. waters.

As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. The mysid shrimp toxicity test for ethylene glycol resulted in an $LC_{50}$ of 970,000 ppm SPP—over 30 times the minimum EPA standard for discharge into coastal waters. Ethylene glycol has the added advantage that it produces no sheen on the receiving waters.

Substantially any water based drilling, drill-in, or completion fluid may be treated according to the present invention. An example formulation of one barrel of a preferred low density deepwater drilling fluid is shown in the following Table:

| Product | Concentration |
| --- | --- |
| Fresh Water | 0.66 bbl |
| MIL-GEL | 15 lb/bbl |
| NaOH | 0.1 lb/bbl |
| MIL-PAC LV | 1.0 lb/bbl |
| BIO-LOSE | 1.0 lb/bbl |
| Sodium Chloride | 38.4 lb/bbl |
| ethylene glycol | 0.30 bbl |
|  | Total = 1 bbl |

MIL-GEL, MIL-PAC, and BIO-LOSE are products which may be obtained from Baker Hughes Inteq, Houston, Tex. The other listed materials are commodities which are commercially available from numerous sources well known to persons of ordinary skill in the art.

The fluid preferably should contain at least about 5 vol %, preferably between about 10–80 vol % of the hydrate suppressor. The temperature at which hydrates form in a fluid having a density of 9.1 lb/gal and containing 10 wt % NaCl/30 vol % ethylene glycol is approximately 30° F. lower than the temperature at which hydrates would form in the same fluid in the absence of ethylene glycol. Because of their relatively low density, fluids containing ethylene glycol should prove useful when encountering gradients having poor fracture integrity. The density of the fluid can be reduced by reducing the salt content of the fluid. In fact, it may be possible to eliminate the need for any salt to suppress hydrate formation. Even with a lowered salt content, the temperature of hydrate formation should be reduced by approximately 30° F. (16.7° C.) when the fluid contains at least about 30% ethylene glycol.

The invention will be more clearly understood with reference to the following examples, which are illustrative only and should not be construed as limiting the invention. In the following Examples, gas hydrate formation was simulated using a gas hydrate generator developed by Milpark Drilling Fluids (now Baker Hughes INTEQ). The gas hydrate generator consisted of a high-pressure (11,000-psi [76,834 kPa]) vessel, temperature and pressure capabilities, and an IBM PC for control of the system and data acquisition. To begin a gas hydrate test, mud was placed into the autoclave cell, the cell was capped and a vacuum was pulled on the cell for 15 minutes while stirring at 500 rpms to remove the air from the cell. After evacuation of the cell, the cell was pressurized with a simulated Green Canyon natural gas having the following mole % composition: 87.243% methane; 0.403% nitrogen; 7.57% ethane; 3.08% propane; 0.51% isobutane; 0.7% normal butane; 0.202% isopentane; and 0.20% normal pentane.

A cooling bath was raised to cover the cell, and the cell was allowed to reach an equilibrium temperature then cooled at a rate of 5° F. (2.8° C.) per hour until hydrate formation was detected. To detect hydrate formation, the computer monitored the temperature (cell and bath) and applied pressure. When the slope of the pressure verses temperature curve changed significantly, hydrates were starting to form (one volume of hydrates can contain 170 volumes of gas at standard conditions).

Once hydrates started forming, the bath temperature was held constant for about 10 hours to allow maximum hydrate formation before heating the bath to room temperature (1.5° F./hour [0.83° C./hour]). During heatup, the gas hydrates became less stable, resulting in the gas being released from the hydrate structure, and pressure increasing. When all of the gas was released, the pressure returned to the initial pressure recorded from the cool-down cycle. This is known as the dissociation point—that is, no hydrates are present at this pressure and temperature.

EXAMPLE I

Drilling fluids having the same composition except for the base fluid were subjected to hydrate equilibrium testing. The base fluid was varied as follows: 10% NaCl/30% by volume ethylene glycol; sea water; 10% NaCl; 20% NaCl; and, 26% NaCl.

Each run generated the pressure-temperature results shown in the following table, which is depicted in chart form in correspondingly numbered FIGS. (1, 2, and 3).

| Component | Ethylene Gylcol/ 10% NaCl | Seawater | 10% NaCl | 20% NaCl | 26% NaCl |
|---|---|---|---|---|---|
| Drill Water, bbls | | | 0.44 | 0.43 | 0.425 |
| Seawater, bbls | | 1 | 0.44 | 0.43 | 0.425 |
| Tap Water, bbls | 0.66 | | | | |
| MIL-PAC LV, lbs/bbl | 1 | | 1.5 | 1.5 | 1.5 |
| BIO-LOSE, lb/bbl | 1 | | 3 | 3 | 3 |
| Caustic Soda, lb/bbl | 0.1 | | 1.25 | 1.25 | 1.25 |
| Drilled solids, lb/bbl | | | 20 | 20 | 20 |
| Ethylene glycol, bbls | 0.3 | | | | |
| NaCl, lb/bbl | 34 | | 34 | 76 | 104 |
| NEW DRILL HP, lb/bbl | 0.5 | | 1.5 | 1.5 | 1.5 |

-continued

| Component | Ethylene Gylcol/ 10% NaCl | Seawater | 10% NaCl | 20% NaCl | 26% NaCl |
|---|---|---|---|---|---|
| MIL-GEL, lb/bbl | 15 | | 10 | 10 | 10 |
| MIL-BAR, lb/bbl | | | 68 | 33 | 9 |
| XCD Polymer, lb/bbl | | | 0.08 | 0.25 | 0.75 |
| Density, ppg | 9.4 | | 10.5 | 10.5 | 10.5 |
| Rheaology @ 120° F. | | | | | |
| P.V., cPs | 11 | | 19 | 18 | 18 |
| Y.P., lb/100 ft² | 10 | | 12 | 11 | 14 |
| Gels, lb/100 ft² | 7/14 | | 3/17/23 | 8/14/19 | 6/11/18 |
| API, cc's/30 min | 4 | | 4 | 4.6 | 4.2 |
| pH | 7.4 | | 9.45 | 9.45 | 9.5 |

MIL-GEL, MIL-PAC, MIL-BAR, NEW DRILL HP, and BIO-LOSE are products which may be obtained from Baker Hughes Inteq, Houston, Tex. XCD Polymer was obtained from Kelco Rotary, San Diego, Calif.

The ethylene glycol fluid imparted greater hydrate suppression than even the saturated sodium chloride fluid. The saturated sodium chloride fluid had a density of 10.0 lbs/gal; therefore, the ethylene glycol imparted greater gas hydrate suppression with an approximate 1.0 lbs/gal density advantage.

EXAMPLE 2

The fluid containing ethylene glycol from Example 1 was subjected to increasing doses of low gravity solids to determine the effect on the fluid properties. API RP 10B and 13B were used to determine the specifics for the various drilling fluids, and the resulting effects on rheological properties, and fluid loss.

| Initial/hot roll | | Hot Rolled | | Hot Rolled | | Hot Rolled | | Hot Rolled |
|---|---|---|---|---|---|---|---|---|
| Aging Temperature | | 150 | | 150 | | 150 | | 150 |
| Aging hours | | 16 | Initially | 16 | Initially | 16 | Initially | 16 |
| Tapwater, bbls | 0.66 | 0.66 | 0.66 | 0.66 | 0.66 | 0.66 | 0.66 |
| Mil-Pac LV, lbs/bbl | 1 | 1 | 1 | 1 | 1 | 1 | 1 |
| Bio-Lose, lbs/bbl | 1 | 1 | 1 | 1 | 1 | 1 | 1 |
| Caustic, lbs/bbl | 0.1 | 0.1 | 0.1 | 0.1 | 0.1 | 0.1 | 0.1 |
| Rev-Dust, lbs/bbl | — | 9 | 9 | 45 | 45 | 63 | 63 |
| ethylene glycol, bbls | .30 | .30 | .30 | .30 | .30 | .30 | .30 |
| NaCl, % by wt. | 10 | 10 | 10 | 10 | 10 | 10 | 10 |
| New-Drill HP, lbs/bbl | 0.5 | 0.5 | 0.5 | 0.5 | 0.5 | 0.5 | 0.5 |
| Mil-Gel, lbs/bbl | 15 | 15 | 15 | 15 | 15 | 15 | 15 |
| Density, ppg | 9.42 | | | | | | |
| Rheologies @ | 120 | 120 | 120 | 120 | 120 | 120 | 120 |
| 600 rpm | 32 | 38 | 42 | 42 | 37 | 43 | 53 |
| 300 rpm | 21 | 26 | 28 | 29 | 24 | 28 | 37 |
| 200 rpm | 18 | 21 | 24 | 24 | 20 | 24 | 30 |
| 100 rpm | 14 | 16 | 18 | 18 | 15 | 18 | 23 |
| 6 rpm | 9 | 10 | 11 | 12 | 8 | 11 | 13 |
| 3 rpm | 8 | 9 | 9 | 11 | 7 | 10 | 12 |
| Plastic Viscosity, cP | 11 | 12 | 14 | 13 | 13 | 15 | 16 |
| Yield Point, lbf/100 ft²̂ | 10 | 14 | 14 | 16 | 11 | 13 | 21 |
| YZ Value | 7 | 8 | 7 | 10 | 6 | 9 | 11 |
| Initial Gel, lbf/100 ft²̂s | 7 | 8 | 7 | 10 | 7 | 9 | 10 |
| 10 min Gel, lbf/100 ft²̂s | 14 | 25 | 20 | 31 | 16 | 30 | 23 |

-continued

| Initial/hot roll | Hot Rolled | | Hot Rolled | | Hot Rolled | | Hot Rolled |
|---|---|---|---|---|---|---|---|
| Aging Temperature | 150 | | 150 | | 150 | | 150 |
| Aging hours | 16 | Initially | 16 | Initially | 16 | Initially | 16 |
| API Fluid Loss, mls | 4 | 4.2 | 3.6 | 4 | 3.8 | 4.2 | 4 |
| pH | 7.4 | 7.6 | 7.6 | 7.8 | 7.8 | 7.6 | 7.7 |
| Lubricity Coefficient | 0.19 | | | | | | |

The fluid containing ethylene glycol had a relatively low density of 9.42 ppg, exhibited tolerance to low gravity solids contamination, and exhibited satisfactory rheological and fluid loss properties.

EXAMPLE 3

Fluids having the following composition were made and API RP 10B and 13B were used to determine the specifics for the various drilling fluids, the resulting effects on rheological properties, and fluid loss.

| Initial/hot roll | | Hot Rolled | | Hot Rolled |
|---|---|---|---|---|
| Aging Temperature | | 150 | | 150 |
| Aging hours | Initially | 16 | Initially | 16 |
| Tapwater, bbls | | 0.66 | 0.66 | 0.66 |
| Mil-Pac LV, lbs | 1 | 1 | 1 | 1 |
| Bio-Lose, lbs | 1 | 1 | 1 | 1 |
| Caustic, lbs | 0.1 | 0.1 | 0.1 | 0.1 |
| Cement, lbs | 1.5 | 1.5 | 5 | 5 |
| Rev-Dust, lbs | — | — | — | — |
| ethylene glycol, bbls | .30 | .30 | .30 | .30 |
| NaCl, % by wt. | 10 | 10 | 10 | 10 |
| New-Drill HP, lbs | 0.5 | 0.5 | 0.5 | 0.5 |
| Mil-Bar, lbs | — | — | — | — |
| Mil-Gel, lbs | 15 | 15 | 15 | 15 |
| Density, ppg | | | | |
| Rheologies @ | 120 | 120 | 120 | 120 |
| 600 rpm | 32 | 30 | 26 | 26 |
| 300 rpm | 21 | 20 | 14 | 14 |
| 200 rpm | 17 | 16 | 10 | 10 |
| 100 rpm | 13 | 12 | 6 | 6 |
| 6 rpm | 8 | 7 | 1 | 2 |
| 3 rpm | 7 | 6 | 1 | 1 |
| Plastic Viscosity, cP | 11 | 10 | 12 | 12 |
| Yield Point, lbf/100 ft$^2$ | 10 | 10 | 2 | 2 |
| YZ Value | 6 | 5 | 1 | 0 |
| Initial Gel, lbf/100 ft$^s$ | 6 | 6 | 1 | 1 |
| 10 min Gel, lbf/100 ft$^s$ | 17 | 14 | 1 | 1 |
| API Fluid Loss, mls | 4 | 4.2 | 4 | 4 |
| pH | 11.1 | 11.3 | 11.6 | 12.4 |

The fluids had a low density, exhibited low cement contamination, and exhibited satisfactory rheological and fluid loss properties.

Persons of ordinary skill in the art will appreciate that many modifications may be made to the embodiments described herein without departing from the spirit of the present invention. Accordingly, the embodiments described herein are illustrative only and are not intended to limit the scope of the present invention.

We claim:

1. A method for suppressing the formation of hydrates and controlling density of a fluid for use during deepwater drilling operations, said method comprising:

providing a fluid comprising a water base, said fluid having a first density of less than about 10 pounds per gallon and having effective rheology and fluid loss control properties, said fluid being selected from the group consisting of a drilling, a drill-in, and a completion fluid;

using as an integral component of said fluid a water-soluble organic compound having a molecular weight below about 800 in an amount effective to achieve a level of hydrate suppression and to produce said first density, wherein said first density is less than a second density of said fluid consisting of said integral components other than said water soluble organic compound;

wherein said water-soluble organic compound is selected from the group consisting of a glycol, a polyglycol, a polyalkyleneoxide, an alkyleneoxide copolymer, a polyalkylene glycol ether, a polyalkyleneoxide glycol ether, a carbohydrate, an amino acid, an aminosulfonate, an alcohol comprising between about 1–3 carbon atoms, a salt of any of the foregoing compounds, and combinations of the foregoing compounds.

2. The method of claim 1 wherein said amount comprises at least about 5 vol % of said fluid.

3. The method of claim 1 wherein said amount comprises between about 10–80 vol % of said fluid.

4. A method for suppressing the formation of hydrates and controlling density of a fluid for use during deepwater drilling operations, said method comprising:

providing a fluid comprising a water base, said fluid having a first density of less than about 10 pounds per gallon and having effective rheology and fluid loss control properties, said fluid being selected from the group consisting of a drilling, a drill-in, and a completion fluid;

using as an integral component of said fluid a water-soluble organic compound having a molecular weight below about 800 in an amount comprising at least about 5 vol %, wherein said amount is effective to achieve a level of hydrate suppression and to produce said first density, wherein said first density is less than a second density of said fluid consisting of said integral components other than said water-soluble organic compound;

wherein said water-soluble organic compound is selected from the group consisting of a glycol, a polyglycol, a polyalkyleneoxide, an alkyleneoxide copolymer, a polyalkylene glycol ether, a polyalkyleneoxide glycol ether, a carbohydrate, an amino acid, an aminosulfonate, an alcohol comprising between about 1–3 carbon atoms, a salt of any of the foregoing compounds, and combinations of the foregoing compounds.

5. A method for suppressing the formation of hydrates and controlling density of a fluid for use during deepwater drilling operations, said method comprising:

providing a fluid comprising a water base, said fluid having a first density of less than about 10 pounds per gallon and having effective rheology and fluid loss control properties, said fluid being selected from the group consisting of a drilling, a drill-in, and a completion fluid;

using as an integral component of said fluid ethylene glycol in an amount effective to achieve a level of hydrate suppression and to produce said first density, wherein said first density is less than a second density of said fluid consisting of said integral components other than said ethylene glycol.

6. The method of claim 4 wherein said amount comprises between about 10–80 vol % of said fluid.

7. The method of claim 5 wherein said amount comprises at least about 5 vol % of said fluid.

8. The method of claim 5 wherein said amount comprises between about 10–80 vol % of said fluid.

9. A method for suppressing the formation of hydrates and controlling density of a fluid for use during deepwater drilling of a formation having a fracture gradient, said method comprising:

providing a fluid comprising a water base, said fluid having a first density at or below said fracture gradient, said fluid having effective rheology and fluid loss control properties, said fluid being selected from the group consisting of a drilling, a drill-in, and a completion fluid;

using as an integral component of said water base a water-soluble organic compound having a molecular weight below about 800 in an amount effective to achieve a level of hydrate suppression and to produce said first density;

wherein said water-soluble organic compound is selected from the group consisting of a glycol, a polyglycol, a polyalkyleneoxide, an alkyleneoxide copolymer, a polyalkylene glycol ether, a polyalkyleneoxide glycol ether, a carbohydrate, an amino acid, an aminosulfonate, an alcohol comprising between about 1–3 carbon atoms, a salt of any of the foregoing compounds, and combinations of the foregoing compounds.

10. The method of claim 9 wherein said amount comprises at least about 5 vol % of said fluid.

11. The method of claim 9 wherein said amount comprises between about 10–80 vol % of said fluid.

12. The method of claim 1 wherein said amount comprises about 30 vol % of said fluid.

13. The method of claim 4 wherein said amount comprises about 30 vol % of said fluid.

14. The method of claim 5 wherein said amount comprises about 30 vol % of said fluid.

15. The method of claim 1 further comprising controlling said first density by increasing said amount of said water-soluble organic compound and correspondingly reducing said quantity of salt.

16. The method of claim 4 further comprising controlling said first density by increasing said amount of said water-soluble organic compound and correspondingly reducing said quantity of salt.

17. The method of claim 5 further comprising controlling said first density by increasing said amount of said water-soluble organic compound and correspondingly reducing said quantity of salt.

18. The method of claim 12 further comprising controlling said first density by increasing said amount of said water-soluble organic compound and correspondingly reducing said quantity of salt.

19. The method of claim 13 further comprising controlling said first density by increasing said amount of said water-soluble organic compound and correspondingly reducing said quantity of salt.

20. The method of claim 14 further comprising controlling said first density by increasing said amount of said water-soluble organic compound and correspondingly reducing said quantity of salt.

21. The method of claim 9 wherein said water-soluble organic compound is non-toxic.

22. The method of claim 21 wherein said compound is selected from the group consisting of an ethylene glycol, a diethylene glycol, a triethylene glycol, a tetraethylene glycol, a propylene glycol, a dipropylene glycol, a tripropylene glycol, a tetrapropylene glycol, a polyethylene oxide, a polypropylene oxide, a copolymer of ethylene oxide and propylene oxide, a polyethylene glycol ether, a polypropylene glycol ether, a polyethylene oxide glycol ether, a polypropylene oxide glycol ether, a polyethylene oxide/polypropylene oxide glycol ether, a monosaccharide, a methylglucoside, a methylglucamine, a disaccharide, fructose, glucose, an amino acid, an amino sulfonate, methanol, ethanol, propanol, and isopropanol.

23. The method of claim 9 wherein compound is selected from the group consisting of an ethylene glycol and a propylene glycol.

* * * * *